(12) United States Patent
Arel et al.

(10) Patent No.: US 9,536,191 B1
(45) Date of Patent: Jan. 3, 2017

(54) REINFORCEMENT LEARNING USING CONFIDENCE SCORES

(71) Applicant: Osaro, Inc., San Francisco, CA (US)

(72) Inventors: Itamar Arel, Knoxville, TN (US); Michael Kahane, San Francisco, CA (US); Khashayar Rohanimanesh, San Francisco, CA (US)

(73) Assignee: Osaro, Inc., San Francisco, CA (US)

( * ) Notice: Subject to any disclaimer, the term of this patent is extended or adjusted under 35 U.S.C. 154(b) by 0 days.

(21) Appl. No.: 14/952,540

(22) Filed: Nov. 25, 2015

(51) Int. Cl.
*G06F 15/18* (2006.01)
*G06N 3/08* (2006.01)
*G06N 99/00* (2010.01)
*G06N 5/02* (2006.01)
*G06N 7/00* (2006.01)
*G06K 9/62* (2006.01)

(52) U.S. Cl.
CPC ............. *G06N 3/08* (2013.01); *G06N 99/005* (2013.01); *G06K 9/6256* (2013.01); *G06K 9/6269* (2013.01); *G06N 5/025* (2013.01); *G06N 7/005* (2013.01)

(58) Field of Classification Search
None
See application file for complete search history.

(56) References Cited

U.S. PATENT DOCUMENTS

| 9,015,093 B1* | 4/2015 | Commons ......... G01C 21/3602 701/23 |
| 2015/0100530 A1* | 4/2015 | Mnih ................. G06N 99/005 706/25 |

OTHER PUBLICATIONS

Accelerating Reinforcement Learning through Implicit Imitation—2003 Bob Price, Craig Boutilier.*
(Continued)

*Primary Examiner* — Kakali Chaki
*Assistant Examiner* — Ababacar Seck
(74) *Attorney, Agent, or Firm* — Fish & Richardson P.C.

(57) ABSTRACT

Methods, systems, and apparatus, including computer programs encoded on computer storage media, for reinforcement learning using confidence scores. One of the methods includes receiving a current observation; for each of multiple actions: determining a respective value function estimate that is an estimate of a return resulting from the agent performing the action in response to the current observation, determining a respective confidence score that is a measure of confidence that the respective value function estimate for the action is an accurate estimate of the return that will result from the agent performing the action in response to the current observation, adjusting the respective value function estimate for the action using the respective confidence score for the action to determine a respective adjusted value function estimate; and selecting an action to be performed by the agent in response to the current observation using the respective adjusted value function estimates.

30 Claims, 5 Drawing Sheets

(56) References Cited

OTHER PUBLICATIONS

Playing Atari with Deep Reinforcement Learning—2013 Volodymyr Mnih Koray Kavukcuoglu David Silver Alex Graves Ioannis Antonoglou Daan Wierstra Martin Riedmiller.*

Bagnell, J. Andrew. *An Invitation to Imitation.* Robotics Institute, Carnegie Mellon University. Published Mar. 15, 2015. Retrieved on Nov. 20, 2015. Retrieved from the internet: URL<https://www.ri.cmu.edu/pub_files/2015/3/InvitationToImitation_3_1415.pdf>.

Ross, S. et al. *Efficient reductions for imitation learning.* Proceedings of the 13th International Conference on Artificial Intelligence and Statistics (AISTATS). May 2010. Retrieved on Nov. 50, 2015. Retrieved from the internet: URL<http://ri.cmu.edu/pub_files/2010/5/Ross-AIStats10-paper.pdf>. 8 pages.

* cited by examiner

REINFORCEMENT LEARNING USING CONFIDENCE SCORES

BACKGROUND

This specification relates to reinforcement learning systems.

In a reinforcement learning system, an agent interacts with an environment by receiving an observation that either fully or partially characterizes the current state of the environment, and in response, performing an action selected from a predetermined set of actions. The reinforcement learning system receives rewards from the environment in response to the agent performing actions and selects the action to be performed by the agent in response to receiving a given observation in accordance with an output of a value function representation. The value function representation takes as an input an observation and an action and outputs a numerical value that is an estimate of the expected rewards resulting from the agent performing the action in response to the observation.

Some reinforcement learning systems use a neural network to represent the value function. That is, the system uses a neural network that is configured to receive an observation and an action and to process the observation and the action to generate a value function estimate.

Neural networks are machine learning models that employ one or more layers of nonlinear units to generate an output for a received input. The output of each hidden layer is used as input to the next layer in the network, i.e., the next hidden layer or the output layer. Each layer of the network generates an output from a received input in accordance with current values of a respective set of parameters.

Some other reinforcement learning systems use a tabular representation of the value function. That is, the system maintains a table or other data structure that maps combinations of observations and actions to value function estimates for the observation-action combinations.

SUMMARY

This specification describes technologies that relate to using confidence scores in reinforcement learning.

In general, one innovative aspect of the subject matter described in this specification can be embodied in methods for selecting an action to be performed by an agent that interacts with an environment by performing actions selected from a set of actions. The methods include the actions of receiving a current observation, the current observation being data that characterizes a current state of the environment; for each action in the set of actions: determining, in accordance with a value function representation and from the action and a current state representation for the current state derived from the current observation, a respective value function estimate that is an estimate of a return resulting from the agent performing the action in response to the current observation, wherein the return is a function of future rewards received in response to the agent performing actions to interact with the environment, determining, in accordance with a confidence function representation and from the current state representation and the action, a respective confidence score that is a measure of confidence that the respective value function estimate for the action is an accurate estimate of the return that will result from the agent performing the action in response to the current observation, adjusting the respective value function estimate for the action using the respective confidence score for the action to determine a respective adjusted value function estimate; and selecting an action to be performed by the agent in response to the current observation using the respective adjusted value function estimates.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

In general, another innovative aspect of the subject matter described in this specification can be embodied in methods for adjusting a value function representation for an agent that interacts with an environment by performing actions selected from a set of actions. The methods include the actions of: obtaining a current observation, the current observation being data that characterizes a current state of the environment, and a previous observation, the previous observation being data that characterizes a previous state of the environment, wherein the environment transitioned into the current state in response to a previous action performed by the agent in response to the previous observation; determining, according to a value function representation and from the previous action and a previous state representation derived from the previous observation, a previous value function estimate that is an estimate of a return resulting from the agent performing the previous action in response to the previous observation; identifying an immediate actual reward resulting from the agent performing the previous action in response to the previous observation; identifying a current action performed by the agent in response to the current observation; determining, according to the value function representation and from the current action and a current state representation derived from the current observation, a current value function estimate that is an estimate of a return that will result from the agent performing the current action in response to the current observation; determining a temporal difference learning error from the immediate actual reward, the current value function estimate, and the previous value function estimate; determining, according to a confidence function representation and from the current state representation and the current action, a current confidence score that is a measure of confidence that the current value function estimate is an accurate estimate of the return that will result from the agent performing the current action in response to the current observation; adjusting the temporal difference learning error using the current confidence score to generate an adjusted temporal difference learning error; adjusting the value function representation using the adjusted temporal difference learning error; and using the adjusted value function representation in selecting a subsequent action to be performed by the agent in response to a subsequent observation.

Other embodiments of this aspect include corresponding computer systems, apparatus, and computer programs recorded on one or more computer storage devices, each configured to perform the actions of the methods.

The subject matter described in this specification can be implemented in particular embodiments so as to realize one or more of the following advantages. By using a confidence function representation to adjust temporal difference learning updates and to select actions to be performed by an agent interacting with an environment, a reinforcement learning system can decrease the amount of agent interaction required to determine a proficient action selection policy. In particular, using the confidence function representation to adjust temporal difference learning updates can reduce the undesirable effects of the agent visiting unfamiliar states during the learning process on the value function estimates generated by a value function representation. Moreover, using the confidence function representation in selecting actions can increase the state space visited by the agent during learning in a principled manner and avoid unnecessarily prolonging the learning process by forcing the reinforcement learning system to favor selecting higher-confidence actions. Additionally, by adjusting the value function representation and selecting actions to be performed by the agent using the confidence function representation, the reinforcement learning system can effectively leverage mentor interaction data, i.e., data derived from interactions of another entity with the environment, to learn accurate value function estimates and to decrease the time and number of interactions required to learn the accurate estimates and to determine a proficient action selection policy.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
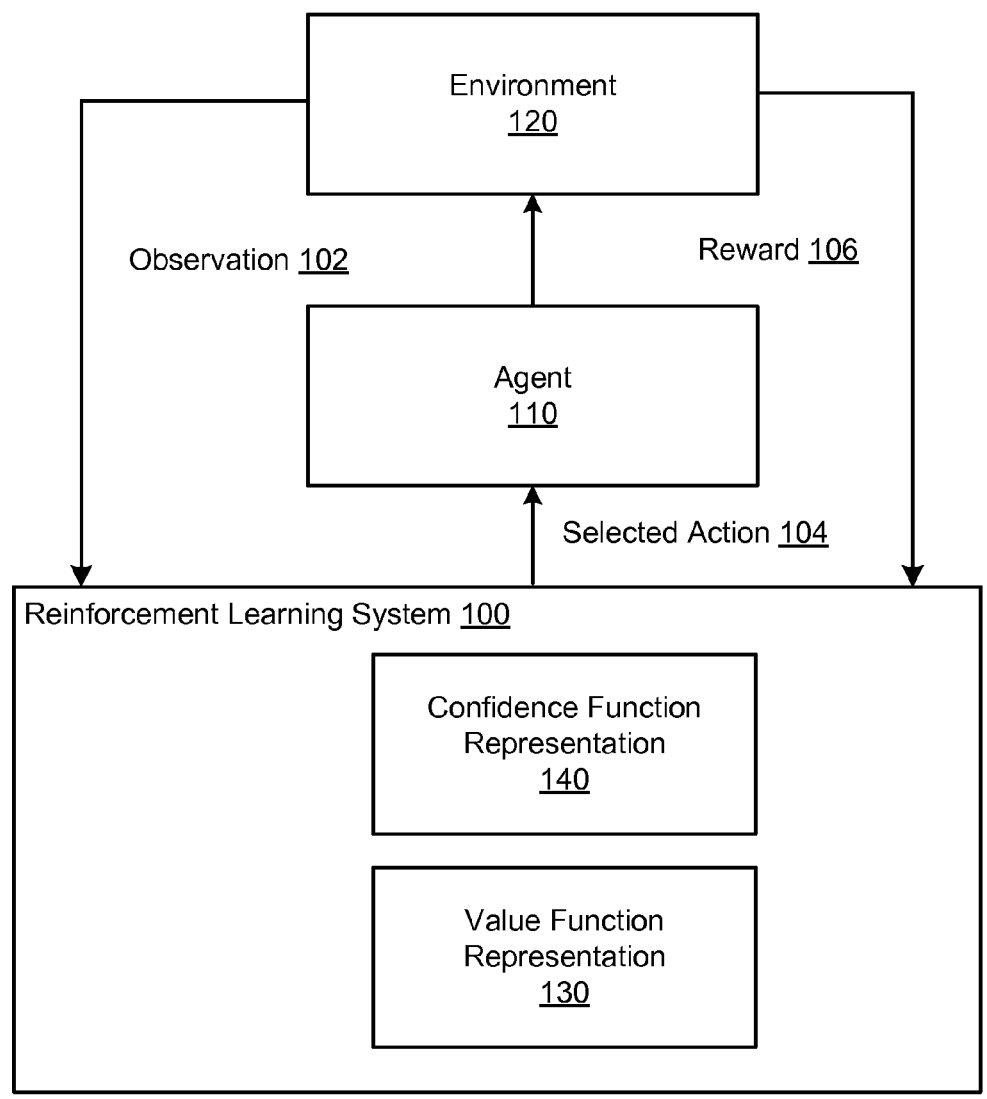
FIG. 1 shows an example reinforcement learning system.

This specification generally describes a reinforcement learning system that uses a confidence function representation to adjust a value function representation, to select actions to be performed by an agent interacting with an environment by performing actions selected from a set of actions, or both.

In some implementations, the environment is a virtualized environment that changes state in response to received user inputs. For example, the environment may be an executing video game. In these implementations, the agent may be a simulated user, i.e., the agent may be a computer program that interacts with the virtualized environment by providing simulated user inputs to the virtualized environment that cause the virtualized environment to transition from one state to another.

In some other implementations, the environment is a real-world environment. For example, the agent may be a robot attempting to complete a specified task and the environment may be the surroundings of the robot as characterized by data captured by one or more sensory input devices of the robot. Example tasks may include assembly tasks performed by industrial robots which may involve grasping and manipulation of objects within a given space of operation.

The reinforcement learning system receives data that partially or fully characterizes the current state of the environment and uses the received data to select an action from the set of actions to be performed by the agent while the environment is in the current state. For example, when the environment is a video game, the data may be an image of the current state of the video game as displayed on a display device. As another example, when the environment is a real-world environment, the data may be an image or video captured by an input device of a robot interacting with the real-world environment. Data received by the reinforcement learning that partially or fully characterizes a state of an environment will be referred to in this specification as an observation.

Generally, which actions are in the set of actions are fixed prior to any given action selection performed by the reinforcement learning system. Thus, in response to any given observation, the system selects the action to be performed by the agent in response to the observation from a predetermined set of actions. In some cases, however, which actions are in the set of actions may be adjusted before the system processes a given observation, e.g., to add a new action to the set or to remove an existing action from the set.

In response to performing the selected action and the environment transitioning into a new state, the reinforcement learning system receives a reward. Generally, the reward is a numeric value that is received from the environment as it transitions into a given state and is a function of the state of the environment. While the agent is interacting with the environment, the reinforcement learning system selects actions to be performed by the agent in order to maximize the expected return. Generally, the expected return is a function of the rewards anticipated to be received over time in response to future actions performed by the agent. That is, the return is a function of future rewards received starting from the immediate reward received in response to the agent performing the selected action. For example, possible definitions of return that the reinforcement learning system attempts to maximize may include a sum of the future rewards, a discounted sum of the future rewards, or an average of the future rewards.

In particular, in response to a given observation, the reinforcement learning system selects the action to be performed by the agent by generating value function estimates in accordance with a value function representation. Each value function estimate is an estimate of the expected return resulting from the agent performing a respective action in response to the given observation that characterizes the current state.

The system uses a confidence function representation to adjust the value function estimates before using the estimates to select the action to be performed by the agent, to adjust the value function representation, or both. In particular, for each value function estimate generated in response to a given observation that characterizes a given state, the system generates a confidence score in accordance with the confidence function representation. The confidence score is a measure of confidence that the corresponding value function estimate is an accurate estimate of the return that will result from the agent performing the corresponding action in response to the given observation that characterizes the given state.

FIG. 1 shows an example reinforcement learning system 100. The reinforcement learning system 100 is an example of a system implemented as one or more computer programs on one or more computers in one or more locations in which the systems, components, and techniques described below are implemented.

The reinforcement learning system 100 selects actions to be performed by an agent 110 that interacts with an environment 120. In particular, the reinforcement learning system 100 receives an observation 102 characterizing a current state of the environment 120 and uses a value function representation 130 and a confidence function representation 140 to select an action 104 to be performed by the agent 110 while the environment is in the current state.

As described above, in some implementations, the environment 120 is a real-world environment. In some of these implementations, the reinforcement learning system 100 may be implemented as one or more computer programs on one or more computers embedded in a mechanical agent interacting with the environment 120. For example, the mechanical agent may be a semi- or fully-autonomous vehicle, watercraft, or aircraft or an underwater, on land, in the air, in space, or industrial robot.

Additionally, as described above, in some implementations, the environment 120 is a virtualized environment and the agent is a computer program that interacts with the virtualized environment. In some of these implementations, the reinforcement learning system 100 may be implemented as one or more computer programs on the same computer or computers as the agent.

The value function representation 130 is a representation of a function that estimates the return resulting from the agent performing specific actions when the environment 120 is in a given state.

In some implementations, the value function representation 130 is a machine learning model, e.g., a deep neural network, that is configured to receive as input a state representation for an environment state and an action from the set of actions and to output a value function estimate for the state-action pair. The value function estimate for a state-action pair is an estimate of the return resulting from the agent performing the input action in response to an observation characterizing the given state of the environment 120.

Generally, the reinforcement learning system 100 derives the state representation for a given state from the received observation that characterizes the given state. In some implementations, the state representation for a given state is the observation received by the reinforcement learning system 100 that characterizes the given state. In some other implementations, the value function representation 130 is a recurrent neural network that maintains an internal state and updates the internal state using each received observation. In particular, in these implementations, the recurrent neural network is configured to receive an observation and to combine the observation with the current internal state of the recurrent neural network to generate the state representation and to process the state representation and an action to generate the value function estimate and to update the internal state of the recurrent neural network. In yet other implementations, the reinforcement learning system 100 combines the current observation with one or more recent observations to generate the state representation. For example, the state representation can be a stack of the observation and a number of most recent observations in the order in which they were received by the reinforcement learning system 100 or a compressed representation of the observation and the most recent observations.

In some other implementations, the value function representation 130 is a tabular representation of the value function, i.e., a table or another data structure that maps combinations of state representations and actions to discrete value function estimates.

The confidence function representation 140 is a representation of a confidence function that outputs scores that are measures of confidence in value function estimates generated in accordance with the value function representation 130 being accurate estimates of the return resulting from the agent performing specific actions in response to a given observation. In some implementations, the confidence function representation 140 is a machine learning model, e.g., a deep neural network, that is configured to receive as input a state representation and an action from the set of actions and to output a confidence score that is a measure of confidence that the value function estimate generated in accordance with the value function representation 130 is an accurate estimate of the return resulting from the agent performing the input action in response to the received observation. In some other implementations, the confidence function representation 140 is a tabular representation of the confidence function, i.e., a table or another data structure that maps combinations of state observations and actions to discrete confidence scores.

The reinforcement learning system 100 uses the value function representation 130 and the confidence function representation 140 to select the action 104 to be performed by the agent 120 in response to the observation 102 by determining, for each action in the set of actions, a respective value function estimate in accordance with the value function representation 130 and a respective confidence score in accordance with the confidence function representation 140. The reinforcement learning system 100 then adjusts the respective value function estimate for the action using the confidence score for the action and uses the adjusted value function estimate to select the action to be performed by the agent 110. Selecting an action to be performed by the agent is described in more detail below with reference to FIG. 2.

Once the agent 110 has performed the selected action 104, the reinforcement learning system 100 identifies a reward 106 resulting from the agent 110 performing the selected action 104. The reward 106 is an immediate actual reward resulting from the agent 110 performing the selected action 104 in response to the observation 102. The reinforcement learning system 100 uses the reward 106 and the confidence function representation 140 to update the value function representation 130. The reinforcement learning system 100 then updates the confidence function representation 140 to reflect the change in the measure of confidence in the value function estimates resulting from the agent 110 having performed the selected action 104 in response to the observation 102. Updating the value function representation and the confidence function representation is described in more detail below with reference to FIGS. 3 and 4.

Figure 2:
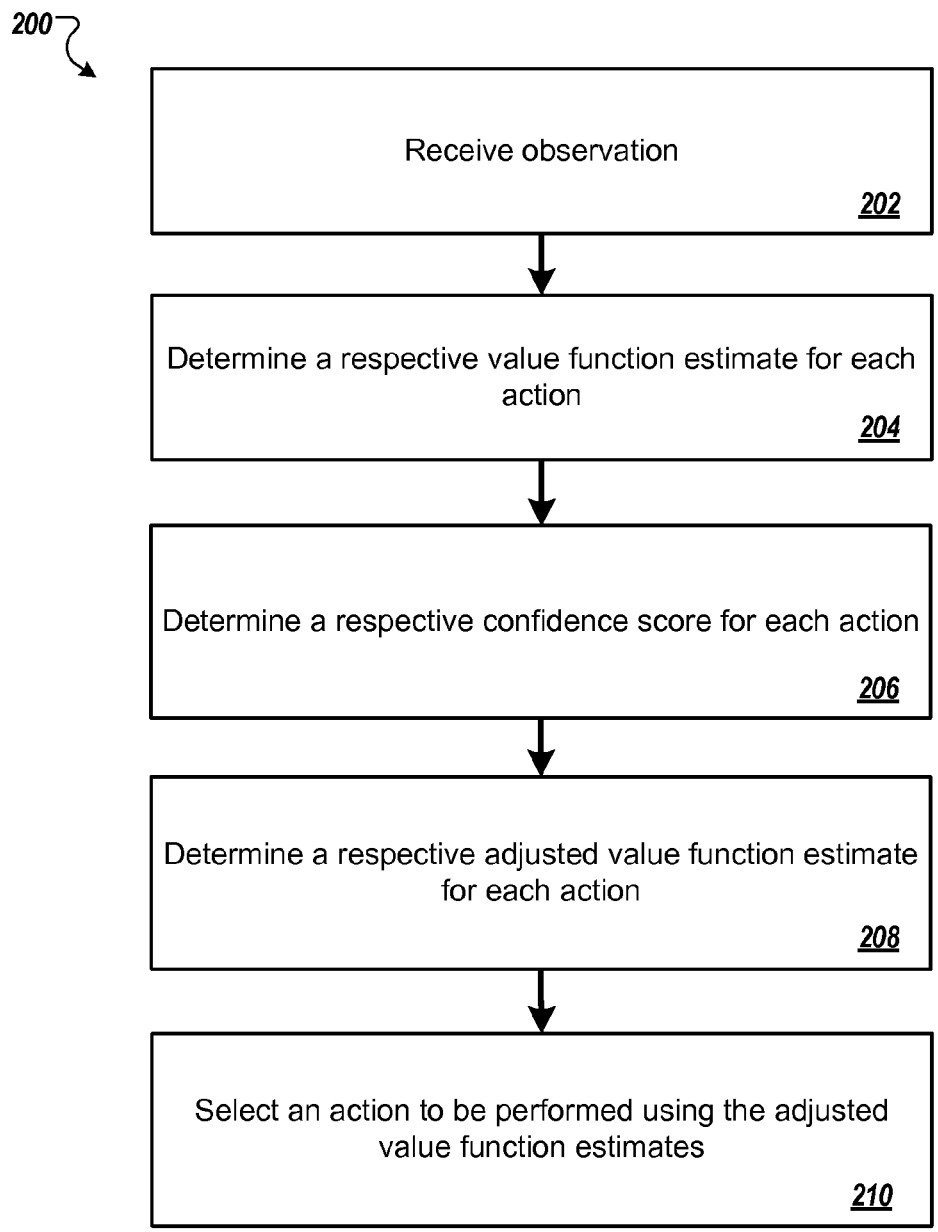
FIG. 2 is a flow diagram of an example process for selecting an action to be performed by an agent.

FIG. 2 is a flow diagram of an example process 200 for selecting an action to be performed by an agent using a value function representation and a confidence function representation. For convenience, the process 200 will be described as being performed by a system of one or more computers located in one or more locations. For example, a reinforcement learning system, e.g., the reinforcement learning system 100 of FIG. 1, appropriately programmed, can perform the process 200.

The system receives an observation characterizing the current state of the environment (step 202).

The system determines a respective value function estimate for each action in the set of actions (step 204) when the environment is in the current state in accordance with the value function representation. As described above, the value function estimate for a given state-action pair is an estimate of the return resulting from the agent performing the given action in response to an observation characterizing the given state.

To determine the value function estimate for a given state-action pair in implementations where the value function representation is a machine learning model, the system processes a state representation for the given state and the given action using the machine learning model to generate the value function estimate for the given action. To determine the value function estimate for a given action in implementations where the value function representation is a tabular representation, the system identifies the value function estimate that is mapped to by the combination of the state representation and the given action in the tabular representation.

The system determines a respective confidence score for each action when the environment is in the current state (step 206). The confidence score for a given state-action pair is a measure of confidence that the value function estimate for the action is an accurate estimate of the return that will result from the agent performing the given action in response to an observation characterizing the given state.

To determine the confidence score for a given state-action pair in implementations where the confidence function representation is a machine learning model, the system processes the given action and the state representation for the given state using the machine learning model to generate the confidence score for the given state-action pair. To determine the confidence score for a given state-action pair in implementations where the confidence function representation is a tabular representation, the system identifies the confidence score that is mapped to by the combination of the state representation and the given action in the tabular representation.

The system adjusts, for each action, the respective value function estimate for the action using the respective confidence score for the action to determine a respective adjusted value function estimate for the action (step 208). Generally, the system adjusts the value function estimates such that the adjusted value function estimate for an action that initially has a value function estimate that is equal to the initial value function estimate for another action but has a confidence score that is greater than the confidence score for the other action has a higher adjusted value function estimate than the other action. For example, in some implementations, the adjusted value function estimate $p_t(s_t, a_t)$ for an action $a_t$ when the environment is in a state t satisfies:

$$p_t(s_t, a_t) = (Q(s_t, a_t) - Q_{min}) \times c(s_t, a_t),$$

where $s_t$ is the state representation of the state t, $Q(s_t, a_t)$ is the value function estimate for the action when the environment is in the state t, $Q_{min}$ is a predetermined minimal possible value function estimate for any action, and $c(s_t, a_t)$ is the confidence score for the action $a_t$ when the environment is in the state t.

The system selects an action to be performed by the agent using the respective adjusted value function estimates for the actions in the set of actions (step 210).

In particular, the system can select the action in accordance with any of a variety of action selection policies. An action selection policy is a policy that specifies how actions should be selected using value function estimates.

For example, in implementations where the action selection policy is a greedy policy, the system selects the action having the highest adjusted value function estimate as the action to be performed by the agent.

As another example, in implementations where the action selection policy is an ϵ-greedy policy, the system selects an action randomly from the set of actions with probability ϵ and selects the action having the highest adjusted value function estimate with probability 1−ϵ, where ϵ is a constant between zero and one.

As another example, in some implementations, the action selection policy specifies that the respective adjusted value function estimate for each action be further adjusted by sampling a value from a distribution that depends on the distribution of the adjusted value function estimates, i.e., such that each adjusted value function estimate can potentially be adjusted by a different value, and that the action that has the highest further adjusted value function estimate be selected.

In this example, the system may compute the standard deviation $\sigma_{pref}(s_t)$ of the adjusted value function estimates. That is, the system can compute a standard deviation $\sigma_{pref}(s_t)$ that satisfies:

$$\sigma_{pref}(s_t) = \sqrt{\frac{1}{N}\sum_{i=1}^{N}\left(p_t(s_t, a_i) - \frac{1}{N}\sum_{j=1}^{N}p_t(s_t, a_j)\right)^2},$$

where N is the total number of actions in the set of actions. The system can then select an action $a^*(s_t)$ such that $a^*(s_t)$ satisfies:

$$a^*(s_t) = \underset{a}{\operatorname{argmax}}\{p_t(s_t, a_i) + \beta N(0, \sigma_{pref}(s_t))\},$$

where $N(0, \sigma_{pref}(s_t))$ denotes a value sampled from the normal distribution with zero mean and standard deviation $\sigma_{pref}(s_t)$, and where β is a predetermined small positive value, e.g., between 0.05 and 0.2.

Figure 3:
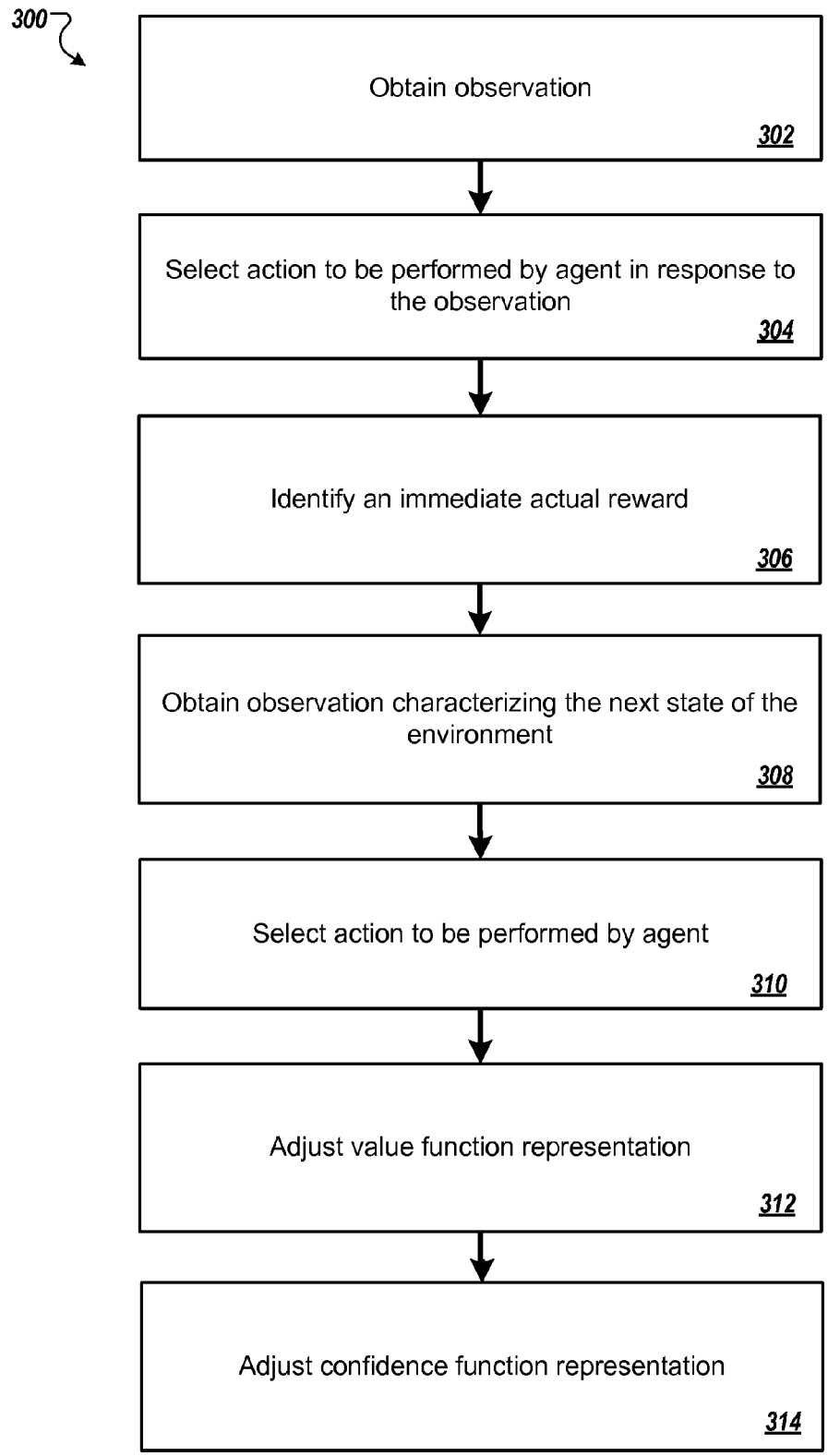
FIG. 3 is a flow diagram of an example process for updating a value function representation and a confidence function representation.

FIG. 3 is a flow diagram of an example process 300 for adjusting a value function representation and a confidence function representation. For convenience, the process 300 will be described as being performed by a system of one or more computers located in one or more locations. For example, a reinforcement learning system, e.g., the reinforcement learning system 100 of FIG. 1, appropriately programmed, can perform the process 300.

The system obtains an observation characterizing an immediately previous state of the environment (step 302).

The system selects an action to be performed by the agent in response to the previous observation (step 304). In some implementations, the system selects the action as described above with reference to FIG. 2. In some other implementations, the system selects the action using value function estimates without adjusting the value function estimates using confidence scores, i.e., the system applies the action selection policy directly to the value function estimates rather than to the adjusted value function estimates as described above with reference to FIG. 2.

The system identifies an immediate actual reward resulting from the agent performing the selected action (step 306). For example, an external system can generate the immediate actual reward after the agent performs the selected action and provide the immediate actual reward to the system.

The system obtains an observation characterizing the current state of the environment, i.e., the state that the environment transitioned to as a result of the agent performing the selected action in response to the previous observation (step 308).

The system selects an action to be performed by the agent in response to the observation characterizing the current state of the environment (step 310). In some implementations, the system selects the action as described above with reference to FIG. 2. In some other implementations, the system selects the action using value function estimates without adjusting the value function estimates using confidence scores.

The system adjusts the value function representation (step 312). The system adjusts the value function representation using the confidence function representation and based on the selected actions and on the immediate actual reward. Adjusting the value function representation is described in more detail below with reference to FIG. 4.

The system adjusts the confidence function representation (step 320). The system adjusts the confidence function representation so that the confidence score for the value function estimate for performing the action selected in response to the previous observation is increased. Adjusting the confidence function representation will be described in more detail below with reference to FIG. 4.

Figure 4:
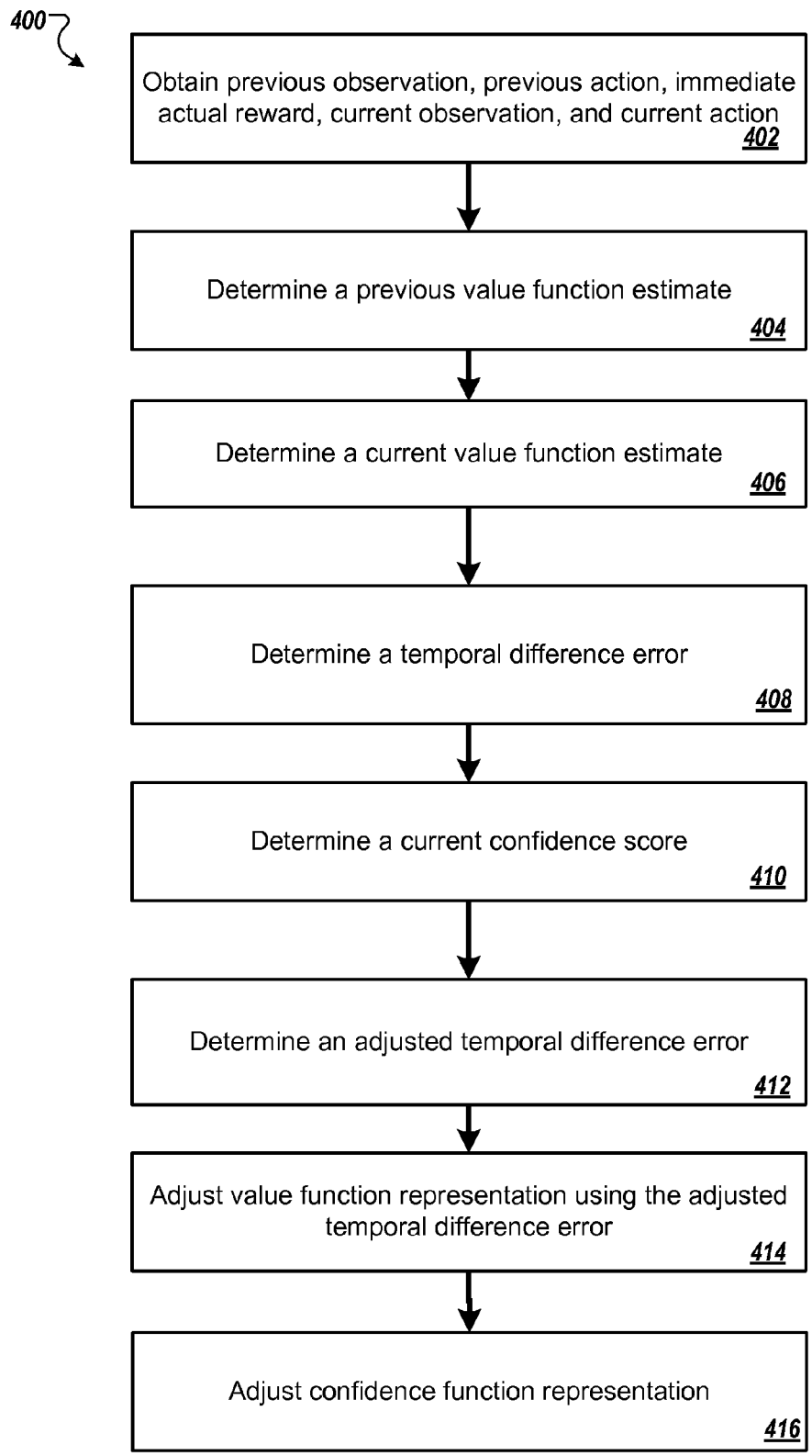
FIG. 4 is a flow diagram of another example process for updating a value function representation and a confidence function representation.

FIG. 4 is a flow diagram of an example process 400 for adjusting a value function representation. For convenience, the process 400 will be described as being performed by a system of one or more computers located in one or more locations. For example, a reinforcement learning system, e.g., the reinforcement learning system 100 of FIG. 1, appropriately programmed, can perform the process 400.

The system obtains a previous observation characterizing a previous state of the environment, a previous action performed by the agent in response to the previous observation, an immediate actual reward, a current observation characterizing the current state of the environment, and a current action performed by the agent in response to the current observation (step 402). In particular, the current state is the state that the environment transitioned into from the previous state and the immediate actual reward is the reward resulting from the agent performing the previous action in response to performing the previous action.

The system determines a previous value function estimate in accordance with the value function representation (step 404). The previous value function estimate is an estimate of the return resulting from the agent performing the previous action in response to the previous observation. To determine the previous value function estimate in implementations where the value function representation is a machine learning model, the system processes the previous action and the state representation for the previous state using the machine learning model to generate the previous value function estimate. To determine the previous value function estimate for a given action in implementations where the value function representation is a tabular representation, the system identifies the value function estimate that is mapped to by the combination of the state representation for the previous state and the previous action in the tabular representation.

The system determines a current value function estimate in accordance with the value function representation (step 406). The current value function estimate is an estimate of the return resulting from the agent performing the current action in response to the current observation. To determine the current value function estimate in implementations where the value function representation is a machine learning model, the system processes the current action and the state representation for the current state using the machine learning model to generate the current value function estimate. To determine the current value function estimate in implementations where the value function representation is a tabular representation, the system identifies the value function estimate that is mapped to by the combination of the current state representation and the current action in the tabular representation.

The system determines a temporal difference learning error from the previous value function estimate, the immediate actual reward, and the current value function estimate (step 408). Generally, the temporal difference learning error is an error between the previous value function estimate and an updated estimate of the return resulting from the agent performing the previous action that is generated using additional information that was not available to the system when selecting the previous action, i.e., the actual reward, the current observation, and the action selected in response to the current observation.

For example, in some implementations where the return is a discounted sum of future rewards, the temporal difference learning error $\delta_t$ satisfies:

$$\delta_t = r_{t+1} + \gamma Q_{t+1}(s_{t+1}, a_{t+1}) - Q_t(s_t, a_t),$$

where $r_{t+1}$ is the immediate actual reward, $\gamma$ is a discount factor between zero and one, $Q_{t+1}(s_{t+1}, a_{t+1})$ is the current value function estimate, and $Q(s_t, a_t)$ is the previous value function estimate.

As another example, in some implementations where the return is the average of future rewards, the temporal difference learning error satisfies:

$$\delta_t = r_{t+1} - \rho_t + Q_{t+1}(s_{t+1}, a_{t+1}) - Q_t(s_t, a_t)$$

where $\rho_t$ denotes the average rate of rewards at time t, which can be independently estimated by the system.

The system determines a current confidence score in accordance with the confidence function representation (step 410). The current confidence score is a measure of confidence that the current value function estimate is an accurate estimate of the return that will result from the agent performing the current action in response to the current observation. To determine the current confidence score in implementations where the confidence function representation is a machine learning model, the system processes the current action and the current state representation using the machine learning model to generate the current confidence score. To determine the current confidence score in implementations where the confidence function representation is a tabular representation, the system identifies the confidence score that is mapped to by the combination of the current state representation and the current action in the tabular representation.

The system determines an adjusted temporal difference learning error by adjusting the temporal difference learning error using the current confidence score (step 412). For example, the system may determine the adjusted temporal difference learning error by computing the product of the current confidence score and the adjusted temporal difference learning error.

The system adjusts the value function representation using the adjusted temporal difference learning error (step 414). In particular, the system determines a value function update using the adjusted temporal difference learning error. For example, in some implementations, the value function update $\Delta Q_t(s_t,a_t)$ satisfies:

$$\Delta Q_t(s_t,a_t) = a\delta_t c(s_{t+1},a_{t+1}),$$

where a is a learning rate parameter, $\delta_t$ is the temporal difference learning error, and $c(s_{t+1},a_{t+1})$ is the current confidence score. The system then adjusts the value function representation using the value function update.

In implementations where the value function representation is a tabular representation, the system can add the value function update to the value function estimate that is mapped to by the combination of the previous state representation and the previous action in the tabular representation to generate an adjusted value function estimate.

In implementations where the value function representation is a machine learning model trained using supervised learning, when training the model, the system can treat the temporal difference learning error as a target error used to determine the model parameter updates, e.g., using stochastic gradient descent with backpropagation.

The system adjusts the confidence function representation (step 416). Generally, the system adjusts the representation to increase a previous confidence score, i.e., the confidence score that is a measure of confidence that the previous value function estimate is an accurate estimate of the return resulting from the agent performing the previous action in response to the previous observation. However, in some implementations, once any confidence score reaches a maximum value, the confidence score can no longer be increased.

The degree to which the previous confidence score is increased depends on the current confidence score, i.e., so that the previous confidence score is increased to a greater degree when the measure of confidence that the current value function estimate is an accurate estimate of the return that will result from the agent performing the current action in response to the current observation is higher. For example, when confidence scores range from 0 to 1 and the confidence function representation is a tabular representation, the previous confidence score $c(s_t,a_t)$ can be updated such that:

$$c(s_t,a_t) = \min[1, c_t(s_t,a_t) + \mu c_t(s_{t+1},a_{t+1})],$$

where $\mu$ is a small positive constant value, e.g., a value between 0.001 and 0.02, and the min operation ensures that no confidence score exceeds 1.

In implementations when the confidence function representation is a machine learning model, when training the machine learning model, the system can define the target error for updating the model parameters at time t as $\mu c_t(s_{t+1},a_{t+1})$.

The system can continue updating the value function representation and the confidence function representation until termination criteria are satisfied, e.g., until a certain period of time has elapsed, until the adjustments to the value function representation, the confidence function representation, or both satisfy convergence criteria, or until instructions are received from a system operator, e.g., a person or some supervisory system.

While the description of FIGS. 3 and 4 describes the value function representation and the confidence function representation being updated as part of the same process, in some implementations, the system updates the value function representation and the confidence function representation independently. That is, the system can perform the processes 300 and 400 and update the value function representation without updating the confidence function representation or perform the processes 300 and 400 and update the confidence function representation without updating the value function representation.

Additionally, in some implementations, the system updates the confidence function representation using a different technique than described above with reference to FIGS. 3 and 4. For example, in some of these implementations, the system determines a confidence score from the frequency of visitation to a particular state or state-action pair. That is, states or state-action pairs that have been visited more frequently are assigned a higher confidence than states or state-action pairs that have been visited relatively less frequently. As another example, the system may update the value function representation but may obtain confidence function updates from an external system.

In some implementations, the system initializes the function representations by setting the value function estimates and confidence scores or parameter values to predetermined or randomly selected initial values.

In some other implementations, however, the system initializes the function representations using an imitation learning technique. That is, the system obtains data representing interactions with the environment by a different entity, e.g., a human user or a different agent, and initializes the value function representation and confidence function representation using the obtained data.

Figure 5:
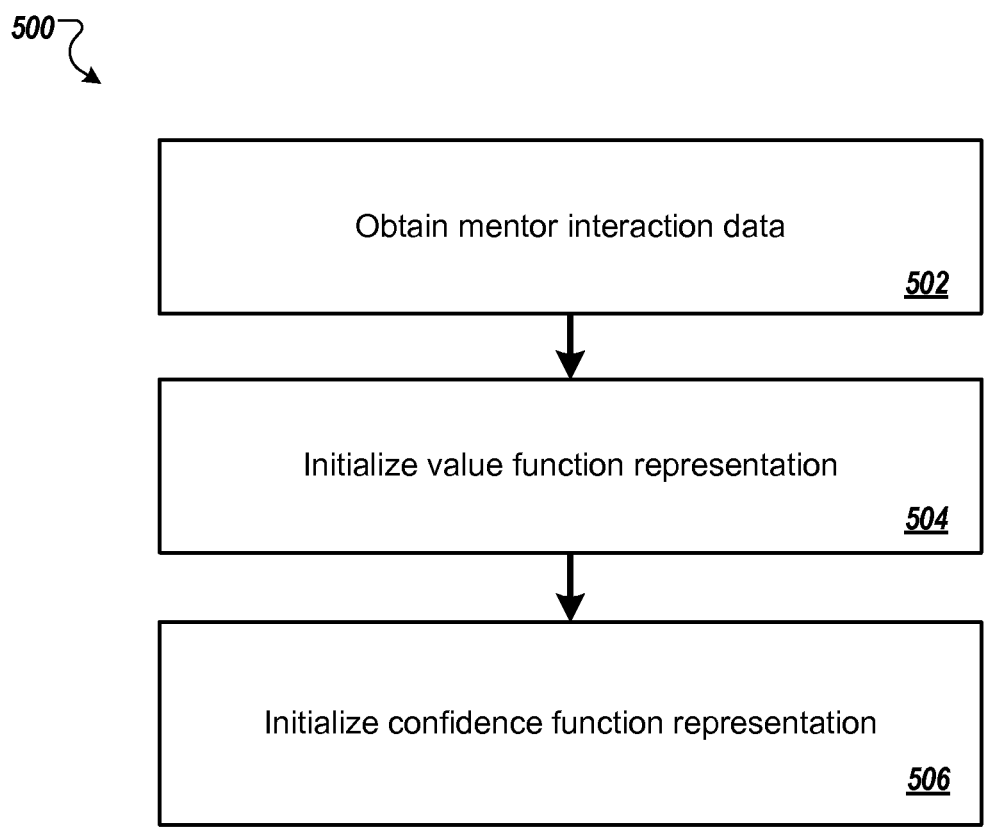
FIG. 5 is a flow diagram of an example process for initializing a value function representation and a confidence function representation.

FIG. 5 is a flow diagram of an example process 500 for initializing a value function representation and a confidence function representation. For convenience, the process 500 will be described as being performed by a system of one or more computers located in one or more locations. For example, a reinforcement learning system, e.g., the reinforcement learning system 100 of FIG. 1, appropriately programmed, can perform the process 500.

The system obtains mentor interaction data (step 502). The mentor interaction data represents interactions by another entity, which may be referred to as the "mentor," with the environment and returns resulting from those interactions. In particular, the mentor interaction data includes, for each action performed by the mentor, a state representation for the state of the environment when the action was performed and the return resulting from the action being performed.

The system initializes the value function representation using the mentor interaction data (step 504). For example, when the value function representation is a tabular representation, the system can set, for each action represented in the mentor interaction data, the value function estimate mapped to by the combination of the state representation and the observation characterizing the state of the environment when the action was performed to be the return resulting from the action being performed. As another example, when the value function representation is a machine learning model, the system can train the machine learning model on the mentor interaction data to adjust the values of the parameters of the machine learning model. That is, the system can generate training data for the machine learning model by assigning as a label for each combination of action and state representation identified in the mentor interaction data the corresponding return and training the machine learning model on the training data using conventional supervised learning techniques.

The system initializes the confidence function representation using the mentor interaction data (step 506). For example, when the confidence function representation is a tabular representation, the system can set, for each action that is represented in the mentor interaction data, the confidence score mapped to by the combination of the action and the state representation for the state of the environment when the action was performed to a first predetermined value. The system can then set the confidence score mapped to by combinations of actions and observations not identified in the mentor interaction data to a second, lower value. As another example, when the confidence function representation is a machine learning model, the system can train the machine learning model on the mentor interaction data to adjust the values of the parameters of the machine learning model. That is, the system can generate training data for the machine learning model by assigning as a label for each combination of action and state representation identified in the mentor interaction data the corresponding predetermined first value and as a label for combinations of actions and state representations not identified in the mentor interaction data the second, lower value and training the machine learning model on the training data using conventional supervised learning techniques.

Once the value function representation and the confidence function representation have been initialized, the system can begin performing the processes 200, 300, and 400 described above to further adjust the value function representation and the confidence function representation.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for selecting an action to be performed by an agent that interacts with an environment by performing actions selected from a set of actions, the method comprising:

receiving a current observation, the current observation being data that characterizes a current state of the environment;

for each action in the set of actions:
determining, in accordance with a value function representation and from the action and a current state representation for the current state derived from the current observation, a respective value function estimate that is an estimate of a return resulting from the agent performing the action in response to the current observation, wherein the return is a function of future rewards received in response to the agent performing actions to interact with the environment, determining, in accordance with a confidence function representation and from the current state representation and the action, a respective confidence score that is a measure of confidence that the respective value function estimate for the action is an accurate estimate of the return that will result from the agent performing the action in response to the current observation, adjusting the respective value function estimate for the action using the respective confidence score for the action to determine a respective adjusted value function estimate, wherein the adjusted value function estimate $p_t(s_t,a_t)$ for the action $a_t$ when the environment is in the current state t satisfies:

$$p_t(s_t,a_t)=(Q(s_t,a_t)-Q_{min})\times c(s_t,a_t), \text{ and}$$

wherein $s_t$ is the current state representation, $Q(s_t,a_t)$ is the value function estimate for the action $a_t$, $Q_{min}$ is a predetermined minimal possible value function estimate for any action, and $c(s_t,a_t)$ is the confidence score for the action $a_t$;

selecting an action to be performed by the agent in response to the current observation using the respective adjusted value function estimates; and performing, by the agent, the selected action to interact with the environment.

2. The method of claim 1, further comprising:
obtaining mentor interaction data that represents interactions of a mentor with the environment and actual returns resulting from the interactions of the mentor; and initializing the value function representation, the confidence function representation, or both using the mentor interaction data.

3. The method of claim 1, wherein the value function representation is a machine learning model that is configured to receive an input state representation and an input action and to generate a value function estimate that is an estimate of the reward to be received as a result from the agent performing the input action in response to an observation characterizing a state represented by the input state representation.

4. The method of claim 1, wherein the value function representation is a tabular representation that maps combinations of input state representations and input actions to value function estimates.

5. The method of claim 1, wherein the confidence function representation is a machine learning model that is configured to receive an input state representation and an input action and to generate a confidence score that is a measure of confidence that a value function estimate for the input action is an accurate estimate of a return that will result from the agent performing the input action in response to an observation characterizing a state represented by the input state representation.

6. The method of claim 1, wherein the confidence function representation is a tabular representation that maps combinations of input state representations and input actions to confidence scores.

7. The method of claim 1, wherein selecting an action to be performed by the agent in response to the current observation using the respective adjusted value function estimates for the actions in the set of actions comprises:
   selecting an action having a highest adjusted value function estimate as the action to be performed by the agent.

8. The method of claim 1, wherein selecting an action to be performed by the agent in response to the current observation using the respective adjusted value function estimates for the actions in the set of actions comprises:
   selecting an action randomly from the set of actions with probability $\epsilon$; and
   selecting an action having a highest adjusted value function estimate as the action to be performed by the agent with probability $1-\epsilon$, wherein $\epsilon$ is a constant between 0 and 1, exclusive.

9. The method of claim 1, wherein selecting an action to be performed by the agent in response to the current observation using the respective adjusted value function estimates comprises:
   for each action in the set of actions, further adjusting the adjusted value function estimate for the action using a value sampled from a distribution that depends on a distribution of the adjusted value function estimates; and
   selecting an action having a highest further adjusted value function estimate as the action to be performed by the agent.

10. The method of claim 9, wherein, for an action $a_t$, the further adjusted value function estimate is expressed as $p_t(s_t,a_t)+\beta N(0,\sigma_{pref}(s_t))$, where $N(0,\sigma_{pref}(s_t))$ denotes a value sampled from a normal distribution with zero mean and standard deviation $\sigma_{pref}(s_t)$, where $\sigma_{pref}(s_t)$ is a standard deviation of the distribution of the adjusted value function estimates, where $p_t(s_t,a_t)$ is the adjusted value function estimate for the action $a_t$, and where B is a predetermined small positive value.

11. A method for adjusting a value function representation for an agent that interacts with an environment by performing actions selected from a set of actions, the method comprising:
   obtaining a current observation, the current observation being data that characterizes a current state of the environment, and a previous observation, the previous observation being data that characterizes a previous state of the environment, wherein the environment transitioned into the current state in response to a previous action performed by the agent in response to the previous observation;
   determining, according to a value function representation and from the previous action and a previous state representation derived from the previous observation, a previous value function estimate that is an estimate of a return resulting from the agent performing the previous action in response to the previous observation;
   identifying an immediate actual reward resulting from the agent performing the previous action in response to the previous observation;
   identifying a current action performed by the agent in response to the current observation;
   determining, according to the value function representation and from the current action and a current state representation derived from the current observation, a current value function estimate that is an estimate of a return that will result from the agent performing the current action in response to the current observation;
   determining a temporal difference learning error from the immediate actual reward, the current value function estimate, and the previous value function estimate;
   determining, according to a confidence function representation and from the current state representation and the current action, a current confidence score that is a measure of confidence that the current value function estimate is an accurate estimate of the return that will result from the agent performing the current action in response to the current observation;
   updating the value function representation in accordance with the current confidence score, whereby a higher current confidence score results in a larger value function update for the value function representation than a relatively lower current confidence score, and wherein the updating comprises:
      adjusting the temporal difference learning error using the current confidence score to generate an adjusted temporal difference learning error; and
      adjusting the value function representation using the adjusted temporal difference learning error;
   using the adjusted value function representation in selecting a subsequent action to be performed by the agent in response to a subsequent observation; and
   performing, by the agent, the subsequent action to interact with the environment.

12. The method of claim 11, further comprising:
   obtaining mentor interaction data that represents interactions of a mentor with the environment and actual returns resulting from the interactions of the mentor; and
   initializing the value function representation, the confidence function representation, or both using the mentor interaction data.

13. The method of claim 11, wherein the value function representation is a machine learning model that is configured to receive an input state representation and an input action and to generate a value function estimate that is an estimate of a return that will result from the agent performing the input action in response to an observation characterizing a state represented by the input state representation, and wherein adjusting the value function representation using the adjusted temporal difference learning error comprises adjusting parameters of the machine learning model using the adjusted temporal difference learning error using a machine learning training technique.

14. The method of claim 11, wherein the value function representation is a tabular representation that maps combinations of input state representations and input actions to value function estimates, and wherein adjusting the value function representation using the adjusted temporal difference learning error comprises updating the value mapped to by a combination of the previous state representation and the previous action using the adjusted temporal difference learning error.

15. The method of claim 11, wherein the confidence function representation is a machine learning model that is configured to receive an input state representation and an input action and to generate a confidence score that is a measure of confidence that a value function estimate for the input action is an accurate estimate of a return that will result from the agent performing the input action in response to an observation characterizing a state represented by the input state representation.

16. The method of claim 11, wherein the confidence function representation is a tabular representation that maps combinations of input state representations and input actions to confidence scores.

17. The method of claim 16, further comprising:
adjusting the confidence function representation to increase a previous confidence score that is a measure of confidence that the previous value function estimate is an accurate estimate of the return resulting from the agent performing the previous action in response to the previous observation.

18. The method of claim 17, wherein the previous confidence score $c_t(s_t,a_t)$ is updated such that:

$$c_t(s_t,a_t)=\min[1,c_t(s_t,a_t)+\mu c_t(s_{t+1},a_{t+1})],$$

wherein $\mu$ is a small positive constant value and $c(s_{t+1},a_{t+1})$ is the current confidence score.

19. The method of claim 11, wherein adjusting the value function representation using the adjusted temporal difference learning error comprises:
determining a value function update $\Delta Q_t(s_t,a_t)$ that satisfies:

$$\Delta Q_t(s_t,a_t)=a\delta_t c(s_{t+1},a_{t+1}),$$

wherein a is a learning rate parameter, $\delta_t$ is the temporal difference learning error, and $c(s_{t+1},a_{t+1})$ is the current confidence score; and
adjusting the value function representation using the value function update.

20. A system comprising one or more computers and one or more storage devices storing instructions that when executed by the one or more computers cause the one or more computers to perform operations for selecting an action to be performed by an agent that interacts with an environment by performing actions selected from a set of actions, the operations comprising:
receiving a current observation, the current observation being data that characterizes a current state of the environment;
for each action in the set of actions:
determining, in accordance with a value function representation and from the action and a current state representation for the current state derived from the current observation, a respective value function estimate that is an estimate of a return resulting from the agent performing the action in response to the current observation, wherein the return is a function of future rewards received in response to the agent performing actions to interact with the environment,
determining, in accordance with a confidence function representation and from the current state representation and the action, a respective confidence score that is a measure of confidence that the respective value function estimate for the action is an accurate estimate of the return that will result from the agent performing the action in response to the current observation,
adjusting the respective value function estimate for the action using the respective confidence score for the action to determine a respective adjusted value function estimate,
wherein the adjusted value function estimate $p_t(s_t,a_t)$ for the action $a_t$ when the environment is in the current state t satisfies:

$$p_t(s_t,a_t)=(Q(s_t,a_t)-Q_{min})\times c(s_t,a_t), \text{ and}$$

wherein $s_t$ is the current state representation, $Q(s_t,a_t)$ is the value function estimate for the action $a_t$, $Q_{min}$ is a predetermined minimal possible value function estimate for any action, and $c(s_t,a_t)$ is the confidence score for the action $a_t$;
selecting an action to be performed by the agent in response to the current observation using the respective adjusted value function estimates; and
performing, by the agent, the selected action to interact with the environment.

21. The system of claim 20, the operations further comprising:
obtaining mentor interaction data that represents interactions of a mentor with the environment and actual returns resulting from the interactions of the mentor; and
initializing the value function representation, the confidence function representation, or both using the mentor interaction data.

22. The system of claim 20, wherein the confidence function representation is a machine learning model that is configured to receive an input state representation and an input action and to generate a confidence score that is a measure of confidence that a value function estimate for the input action is an accurate estimate of a return that will result from the agent performing the input action in response to an observation characterizing a state represented by the input state representation.

23. The system of claim 20, wherein the confidence function representation is a tabular representation that maps combinations of input state representations and input actions to confidence scores.

24. A system comprising one or more computers and one or more storage devices storing instructions that when executed by the one or more computers cause the one or more computers to perform operations for adjusting a value function representation for an agent that interacts with an environment by performing actions selected from a set of actions, the operations comprising:
obtaining a current observation, the current observation being data that characterizes a current state of the environment, and a previous observation, the previous observation being data that characterizes a previous state of the environment, wherein the environment transitioned into the current state in response to a previous action performed by the agent in response to the previous observation;
determining, according to a value function representation and from the previous action and a previous state representation derived from the previous observation, a previous value function estimate that is an estimate of a return resulting from the agent performing the previous action in response to the previous observation;
identifying an immediate actual reward resulting from the agent performing the previous action in response to the previous observation;
identifying a current action performed by the agent in response to the current observation;

determining, according to the value function representation and from the current action and a current state representation derived from the current observation, a current value function estimate that is an estimate of a return that will result from the agent performing the current action in response to the current observation;

determining a temporal difference learning error from the immediate actual reward, the current value function estimate, and the previous value function estimate;

determining, according to a confidence function representation and from the current state representation and the current action, a current confidence score that is a measure of confidence that the current value function estimate is an accurate estimate of the return that will result from the agent performing the current action in response to the current observation;

updating the value function representation in accordance with the current confidence score, whereby a higher current confidence score results in a larger value function update for the value function representation than a relatively lower current confidence score, and wherein the updating comprises:

adjusting the temporal difference learning error using the current confidence score to generate an adjusted temporal difference learning error; and adjusting the value function representation using the adjusted temporal difference learning error;

using the adjusted value function representation in selecting a subsequent action to be performed by the agent in response to a subsequent observation; and performing, by the agent, the subsequent action to interact with the environment.

25. The system of claim 24, the operations further comprising:

obtaining mentor interaction data that represents interactions of a mentor with the environment and actual returns resulting from the interactions of the mentor; and initializing the value function representation, the confidence function representation, or both using the mentor interaction data.

26. The system of claim 24, wherein the value function representation is a machine learning model that is configured to receive an input state representation and an input action and to generate a value function estimate that is an estimate of a return that will result from the agent performing the input action in response to an observation characterizing a state represented by the input state representation, and wherein adjusting the value function representation using the adjusted temporal difference learning error comprises adjusting parameters of the machine learning model using the adjusted temporal difference learning error using a machine learning training technique.

27. The system of claim 24, wherein the value function representation is a tabular representation that maps combinations of input state representations and input actions to value function estimates, and wherein adjusting the value function representation using the adjusted temporal difference learning error comprises updating the value mapped to by a combination of the previous state representation and the previous action using the adjusted temporal difference learning error.

28. The system of claim 24, wherein the confidence function representation is a tabular representation that maps combinations of input state representations and input actions to confidence scores.

29. The system of claim 24, the operations further comprising:

adjusting the confidence function representation to increase a previous confidence score that is a measure of confidence that the previous value function estimate is an accurate estimate of the return resulting from the agent performing the previous action in response to the previous observation.

30. The system of claim 24, wherein adjusting the value function representation using the adjusted temporal difference learning error comprises:

determining a value function update $\Delta Q_t(s_t, a_t)$ that satisfies:

$$\Delta Q_t(s_t, a_t) = a \delta_t c(s_{t+1}, a_{t+1}),$$

wherein a is a learning rate parameter, $\delta_t$ is the temporal difference learning error, and $c(s_{t+1}, a_{t+1})$ is the current confidence score; and adjusting the value function representation using the value function update.

* * * * *